United States Patent
Choi et al.

(10) Patent No.: US 9,665,274 B2
(45) Date of Patent: May 30, 2017

(54) METHOD OF CONTROLLING VIRTUAL KEYPAD AND ELECTRONIC DEVICE THEREFOR

(71) Applicant: Samsung Electronics Co., Ltd., Gyeonggi-do (KR)

(72) Inventors: Yoon-Suk Choi, Gyeonggi-do (KR); Gi-Tae Mun, Gyeonggi-do (KR); Seung-Ho Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 140 days.

(21) Appl. No.: 14/194,512

(22) Filed: Feb. 28, 2014

(65) Prior Publication Data
US 2014/0240265 A1 Aug. 28, 2014

(30) Foreign Application Priority Data
Feb. 28, 2013 (KR) .................. 10-2013-0022101

(51) Int. Cl.
*G06F 3/0488* (2013.01)
*G06F 3/0482* (2013.01)

(52) U.S. Cl.
CPC ........ *G06F 3/04886* (2013.01); *G06F 3/0482* (2013.01); *G06F 3/04883* (2013.01)

(58) Field of Classification Search
CPC . G06F 3/04886; G06F 3/04883; G06F 3/0236
See application file for complete search history.

(56) References Cited

U.S. PATENT DOCUMENTS

| | | | | |
|---|---|---|---|---|
| 2005/0275633 A1* | 12/2005 | Varanda | ............... | G06F 3/0481 345/173 |
| 2010/0211904 A1* | 8/2010 | Yun | ..................... | G06F 3/0236 715/773 |
| 2012/0038674 A1 | 2/2012 | Stergiou et al. | | |
| 2012/0146916 A1* | 6/2012 | Goong | ................. | G06F 3/0416 345/169 |
| 2013/0241837 A1* | 9/2013 | Oga | .................... | G06F 3/04886 345/168 |
| 2013/0321340 A1* | 12/2013 | Seo | ....................... | G06F 1/1641 345/174 |
| 2014/0150042 A1* | 5/2014 | Pacor | .............. | H04N 21/21805 725/116 |
| 2014/0240265 A1* | 8/2014 | Choi | ................... | G06F 3/04886 345/173 |

FOREIGN PATENT DOCUMENTS

WO WO 2007/014064 A2 2/2007

* cited by examiner

*Primary Examiner* — Ricardo L Osorio

(57) ABSTRACT

An apparatus and method for controlling a virtual keypad in an electronic device. The method includes determining whether a touch is sensed, determining whether the touch is held during a reference time when the touch is sensed, determining whether a coordinate of the touch is included in a reference region when the touch is held during the reference time, and displaying the virtual keypad based on the coordinate of the touch when the coordinate of the touch is included in the reference region.

18 Claims, 11 Drawing Sheets

METHOD OF CONTROLLING VIRTUAL KEYPAD AND ELECTRONIC DEVICE THEREFOR

PRIORITY

The present application is related to and claims the benefit under 35 U.S.C. §119(a) of a Korean patent application filed in the Korean Intellectual Property Office on Feb. 28, 2013 and assigned Serial No. 10-2013-0022101, the entire disclosure of which is hereby incorporated by reference.

TECHNICAL FIELD

The present disclosure relates to an apparatus and method for controlling a virtual keypad in an electronic device.

BACKGROUND

Each of electronic devices, which has become necessities of modern people due to ease in carrying it, has been developed into each of multimedia devices which provides various multimedia services such as a voice and video communication service, an information input and output service, and a data storage service.

As described above, as the multimedia services have been provided, an amount of information processed and displayed in the electronic devices has been increased. Accordingly, there is a growing interest in the electronic devices, each of them having a touch screen which may improve space utilization and increase a size of a display unit thereof.

The touch screen is an input and output device for inputting and displaying information on one screen. Accordingly, when the touch screen is installed in the electronic device, the electronic device may increase a display size by removing a separate input device such as a keypad. For example, a touch screen with a full touch type in which the entire screen is applied to the touch screen is installed in the electronic device, and the electronic device may enlarge a screen size by using the entire surface as a screen.

However, when a display size of the electronic device is increased, there is an inconvenience in that it is difficult for a user of the electronic device to adjust information displayed on a display region with his or her one hand.

SUMMARY

To address the above-discussed deficiencies of the prior art, it is a primary object to provide an apparatus and method for controlling a virtual keypad in an electronic device.

Another aspect of the present disclosure is to provide an apparatus and method for displaying a virtual keypad in consideration of touch information in an electronic device.

Another aspect of the present disclosure is to provide an apparatus and method for displaying a virtual keypad in consideration of touch information on a reference region in an electronic device.

Another aspect of the present disclosure is to provide an apparatus and method for displaying a virtual keypad in consideration of gradient information in an electronic device.

Another aspect of the present disclosure is to provide an apparatus and method for displaying a virtual keypad in consideration of drag information in an electronic device.

Another aspect of the present disclosure is to provide an apparatus and method for determining a shape of a virtual keypad according to an application program in an electronic device.

In accordance with an aspect of the present disclosure, a method of controlling a virtual keypad in an electronic device is provided. The method includes determining whether a touch is sensed, determining whether the touch is held during a reference time when the touch is sensed, determining whether a coordinate of the touch is included in a reference region when the touch is held during the reference time, and displaying the virtual keypad in consideration of the coordinate of the touch when the coordinate of the touch is included in the reference region.

In accordance with another aspect of the present disclosure, an electronic device is provided. The electronic device includes at least one processor, at least one memory, and at least one program which is stored in at least the one memory and is configured to be executable by at least the one processor, wherein at least the one processor determines whether a touch is sensed, determines whether the touch is held during a reference time when the touch is sensed, determines whether a coordinate of the touch is included in a reference region when the touch is held during the reference time, and displays a virtual keypad in consideration of the coordinate of the touch when the coordinate of the touch is included in the reference region.

Before undertaking the DETAILED DESCRIPTION OF THE DISCLOSURE below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Exemplary embodiments of the present disclosure will be described herein below with reference to the accompanying drawings. In the following description, well-known functions or constructions are not described in detail since they would obscure the disclosure in unnecessary detail.

Hereinafter, a description will be given for an apparatus and method for controlling a virtual keypad in consideration of touch information in an electronic device.

Hereinafter, the electronic device may be any one of a mobile communication terminal, a Personal Digital Assistant (PDA), a Personal Computer (PC), a laptop, a smart phone, a netbook, a TV (Television), a Mobile Internet Device (MID), a Ultra Mobile PC (UMPC), a tablet PC, a navigation device, a smart TV, a digital camera, and a Moving Picture Experts Group (MPEG) layer 3 (MP3) player, each of them having a touch screen.

Hereinafter, a touch is referred to as a touch-down in a state where touch input is sensed. Touch motion indicates a state where a touch point is moved in a state where a touch is held. A touch release is referred to as a touch-up in a state where touch input is ended.

Figure 1:
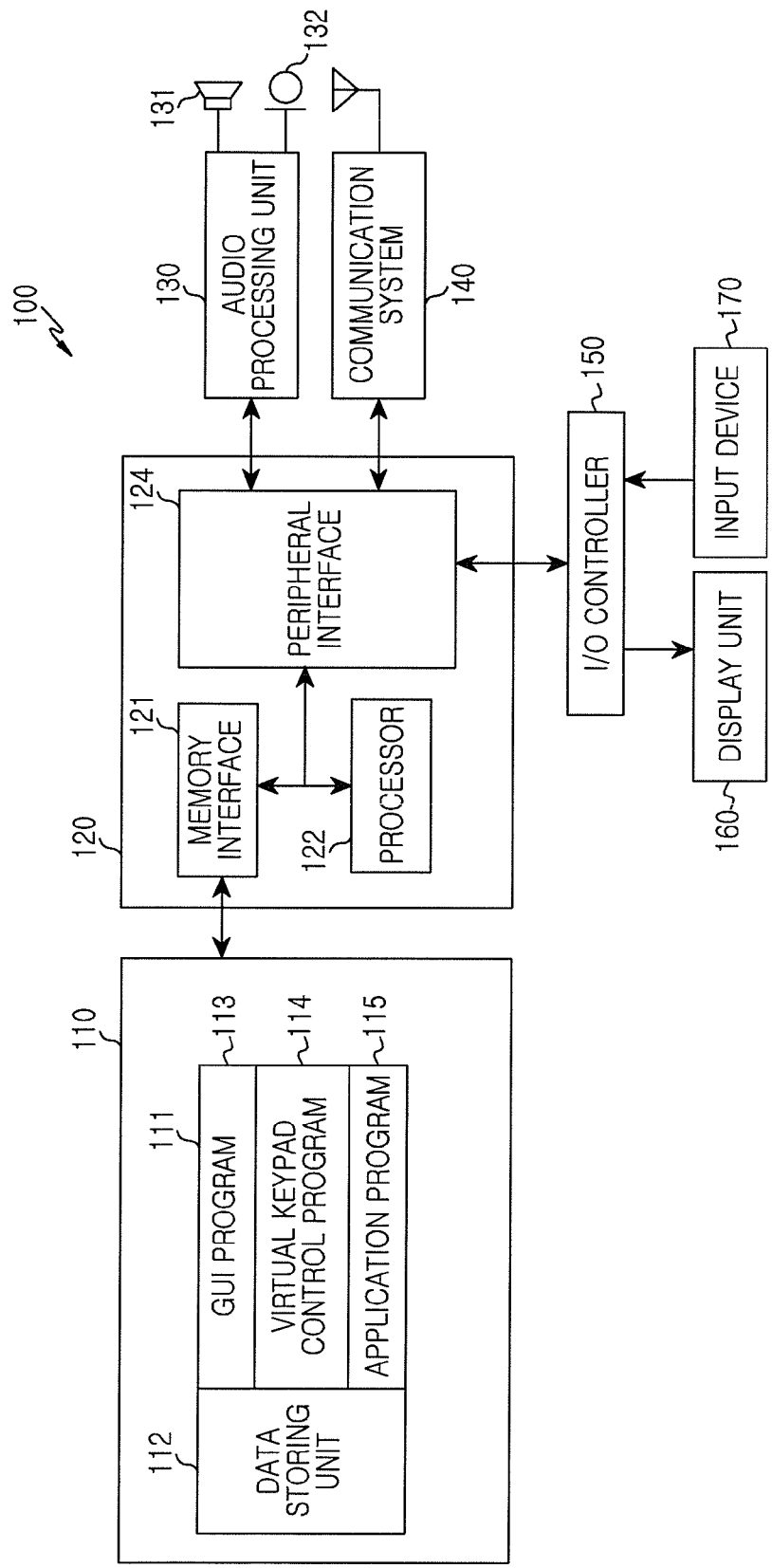
FIG. 1 illustrates a block diagram of configuration of an electronic device according to one embodiment of the present disclosure.

FIG. 1 illustrates a block diagram of configuration of an electronic device according to one embodiment of the present disclosure.

As shown in FIG. 1, the electronic device denoted by 100 may include a memory 110, a processor unit 120, an audio processing unit 130, a communication system 140, an Input/Output (I/O) controller 150, a display unit 160, and an input device 170. Herein, the memory 110 may be a plurality of memories.

A description will be given for respective components as follows.

The memory 110 may include a program storing unit 111 for storing programs for controlling operations of the electronic device 100 and a data storing unit 112 for storing data generated while the programs are executed. For example, the data storing unit 112 stores configuration information of a virtual keypad. Herein, the configuration information of the virtual keypad may include at least one of at least one control menu to be displayed on the virtual keypad, a position of the virtual keypad, a shape of the virtual keypad, a size of the virtual keypad, transparency of the virtual keypad, and a color degree of the virtual keypad.

The program storing unit 111 may include a Graphic User Interface (GUI) program 113, a virtual keypad control program 114, and at least one application program 115. Herein, the programs included in the program storing unit 111 may be expressed in an instruction set as a set of instructions.

The GUI program 113 may include at least one software component for providing a UI as graphics on the display unit 160. For one example, the GUI program 113 may include an instruction for displaying information of an application program driven by a processor 122 on the display unit 160. For another example, the GUI program 113 may display a virtual keypad on the display unit 160 by the processor 122.

Figure 6A:
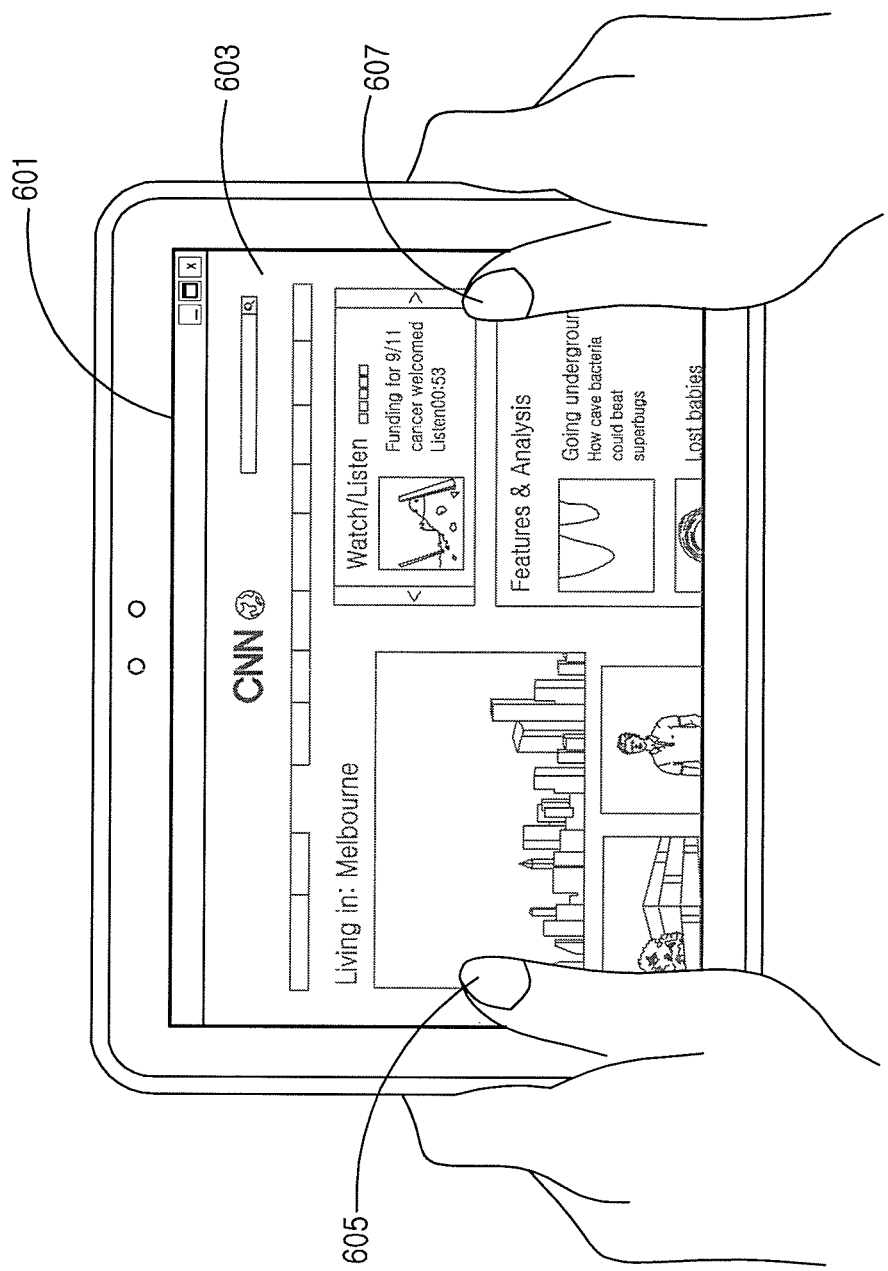
FIGS. 6A to 6E illustrate a process of displaying a virtual keypad in consideration of touch information in an electronic device according to one embodiment of the present disclosure.
Figure 6B:
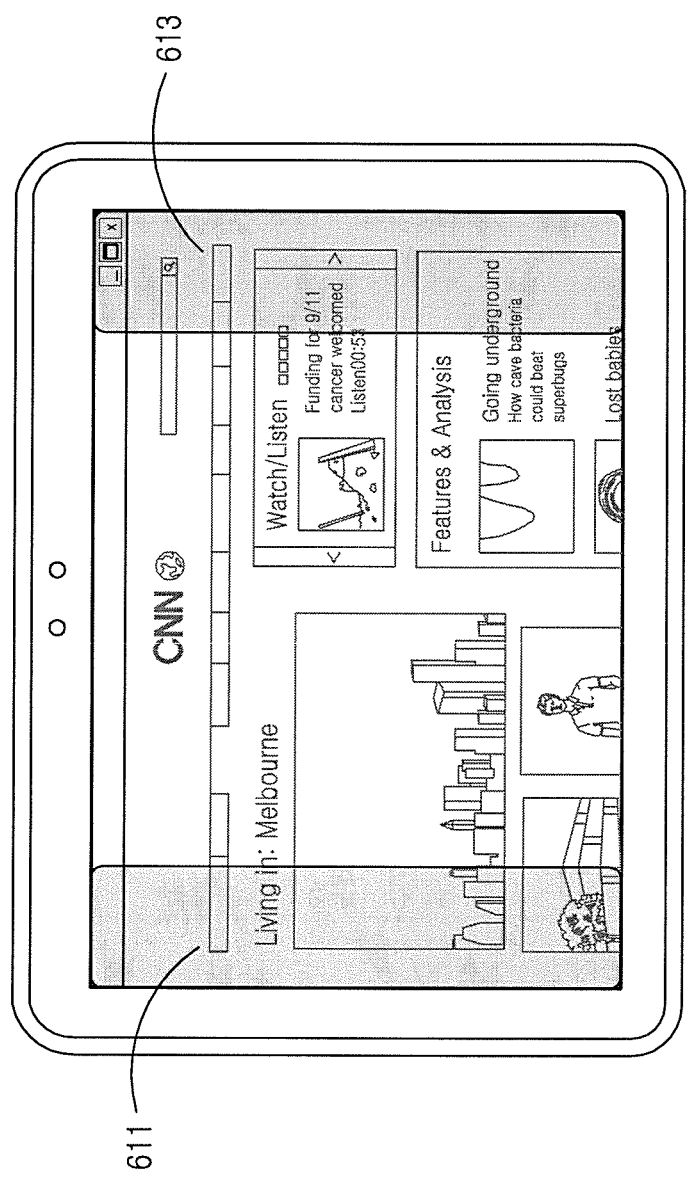
Figure 6C:
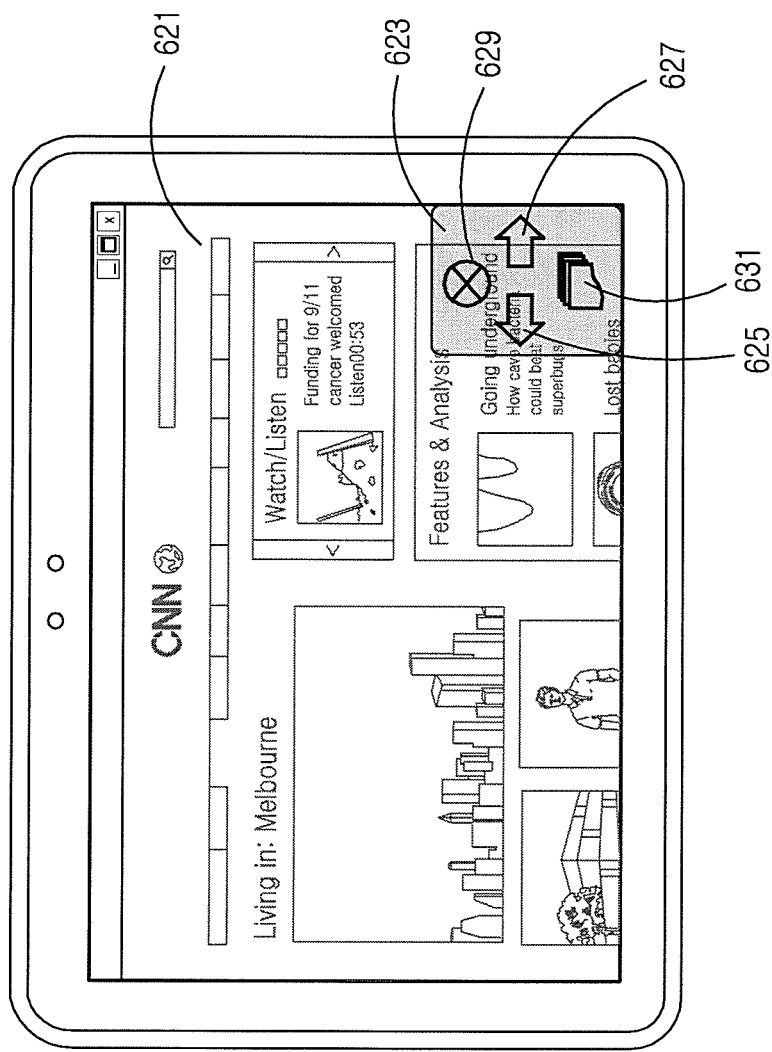

The virtual keypad control program 114 may include at least one software component for controlling a virtual keypad in consideration of touch information provided from the input device 170. For example, as shown in FIG. 6A, when a touch 607 on an internet application program 603 is sensed, the virtual keypad control program 114 determines whether a time when the touch 607 is held is greater than or equal to a reference time. When the touch 607 on the internet application program 603 is held during the reference time, the virtual keypad control program 114 determines, as shown in FIG. 6B, whether a coordinate of the touch 607 is included in a reference region. When the coordinate of the touch 607 is included in the reference region 613, the virtual keypad control program 114 performs, as shown in FIG. 6C, a control operation to display a virtual keypad 623 on the display unit 160 through the GUI program 113.

In addition, when a touch is sensed, the virtual keypad control program 114 determines whether a coordinate of the touch is fixed. If the coordinate of the touch is fixed, the virtual keypad control program 114 may determine whether the touch is held during a reference time.

Figure 6D:
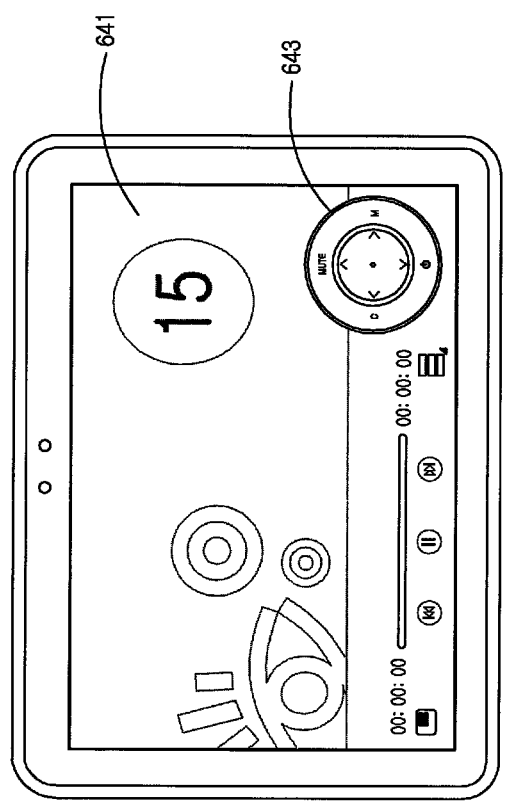
Figure 6E:
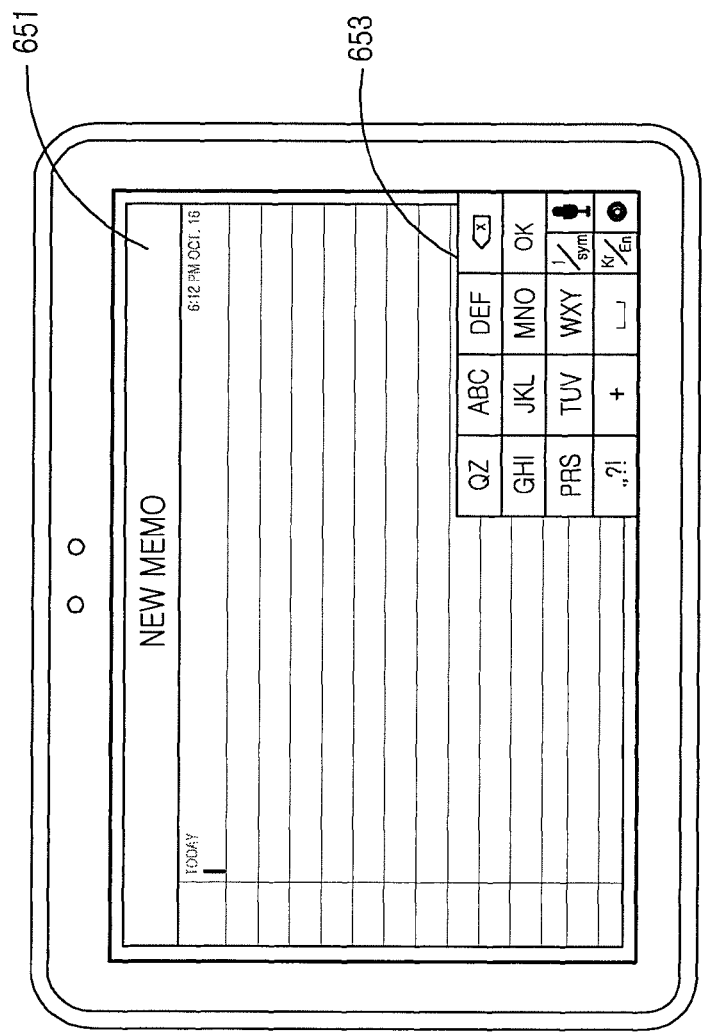

In addition, the virtual keypad control program 114 may perform a control operation to change a shape of a virtual keypad in consideration of an application program which is being driven. For one example, as shown in FIG. 6D, when a video reproduction application program 641 is being driven, the virtual keypad control program 114 may perform a control operation to display a virtual control menu 643 which may control the video reproduction application program 641 through the GUI program 113. For another example, as shown in FIG. 6E, when a memo application program 651 is being driven, the virtual keypad control program 114 may perform a control operation to display a virtual keypad 653 which may input memo contents to the memo application program 651 through the GUI program 113.

In addition, when a plurality of touches are sensed, the virtual keypad control program 114 may perform a control operation to display a virtual keypad on at least one touch coordinate through the GUI program 113 in consideration of a gradient of the electronic device 100.

In addition, after the virtual keypad is displayed, when input on the virtual keypad is not sensed during a reference time, the virtual keypad control program 114 may perform a control operation to release the display of the virtual keypad.

In addition, after the virtual keypad is displayed, when drag on the virtual keypad is generated, the virtual keypad control program 114 may perform a control operation to change a position of the virtual keypad and display the virtual keypad in consideration of information about the drag through the GUI program 113.

In addition, after the virtual keypad is displayed, when rotation of the electronic device 100 is sensed, the virtual keypad control program 114 may perform a control operation to change a position of the virtual keypad and display the virtual keypad in consideration of the rotation of the electronic device 100 through the GUI program 113.

The application program 115 may include a software component for at least one application program installed in the electronic device 100.

The processor unit 120 may include a memory interface 121, at least one processor 122, and a peripheral interface 124. Herein, the memory interface 121, at least the one processor 122, and the peripheral interface 124 which are included in the processor unit 120 may be integrated in at least one Integrated Circuit (IC) or be separately implemented.

The memory interface 121 controls that a component like the processor 122 or the peripheral interface 124 accesses the memory 110.

The peripheral interface 124 controls connection among an I/O peripheral of the electronic device 100, the processor 122, and the memory interface 121.

The processor 122 provides a variety of multimedia services using at least one software program. Also, the processor 122 executes at least one program stored in the memory 110 and provides a service according to the corresponding program.

The audio processing unit 130 provides an audio interface between a user and the electronic device 100 through a speaker 131 and a microphone 132.

The communication system 140 performs a communication function for voice and data communication. Herein, the communication system 140 may be classified into a plurality of communication sub-modules which support different communication networks. For example, the communication network may be, but is not limited to, any one of a Global System for Mobile communication (GSM) network, an Enhanced Data GSM Environment (EDGE) network, a Code Division Multiple Access (CDMA) network, a W-CDMA network, a Long Term Evolution (LIE) network, an Orthogonal Frequency Division Multiple Access (OFDMA) network, a wireless Local Area Network (LAN), a Bluetooth network, a Near Field Communication (NFC) network.

The I/O controller 150 provides an interface between I/O devices, such as the display device 160 and the input device 170, and the peripheral interface 124.

The display unit 160 displays state information of the electronic device 100, characters input by the user, moving pictures, and still pictures. For example, the display unit 160 displays information of an application program driven by the processor 122.

The input device 170 provides input data generated by selection of the user to the processor unit 120 through the I/O controller 150. Herein, the input device 170 may include a keypad including at least one hardware button and a touch pad for sensing touch information. For example, the input device 170 provides touch information, such as a touch sensed through the touch pad, touch motion, and a touch release, to the processor 122 through the I/O controller 150.

Figure 2:
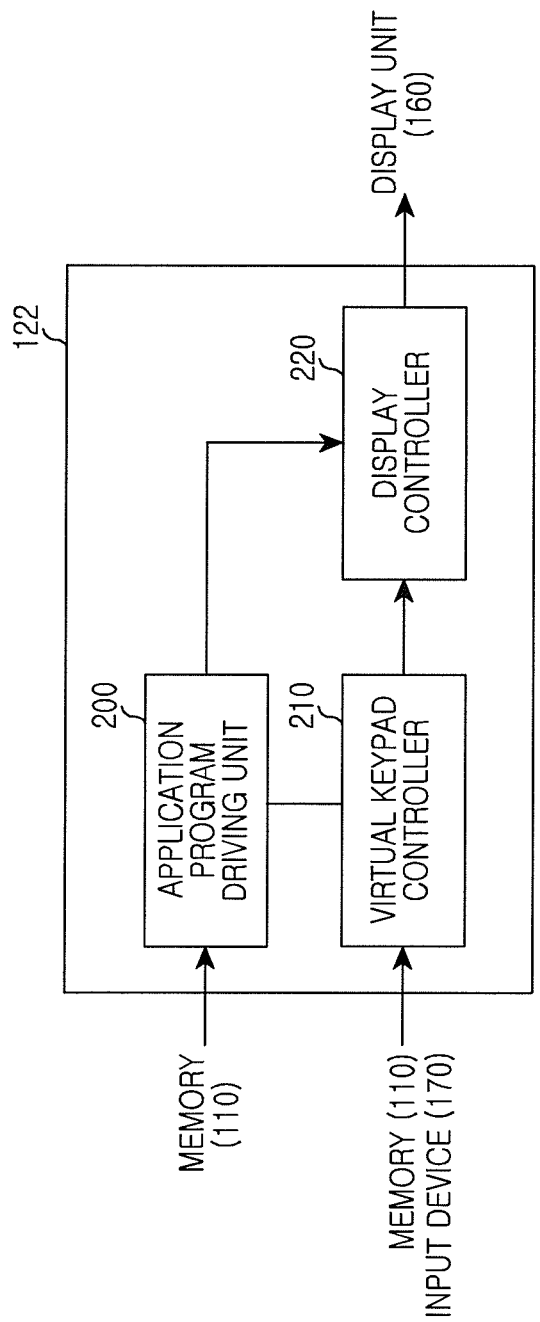
FIG. 2 illustrates a block diagram of detailed configuration of a processor according to one embodiment of the present disclosure.

FIG. 2 illustrates a block diagram of detailed configuration of a processor according to one embodiment of the present disclosure.

As shown in FIGS. 1 and 2, the processor 122 may include an application program driving unit 200, a virtual keypad controller 210, and a display controller 220.

The application program driving unit 200 executes at least the one application program 115 stored in the program storing unit 111 and provides a service according to the corresponding application program. Herein, the application program driving unit 200 may provide a virtual keypad in the corresponding application program according to virtual keypad configuration information provided from the virtual keypad controller 210.

The virtual keypad controller 210 executes the virtual keypad control program 114 stored in the program storing unit 111 and controls a virtual keypad in consideration of touch information provided from the input device 170. For example, as shown in FIG. 6A, when a touch 607 on an internet application program 603 is sensed, the virtual keypad controller 210 determines whether a time when the touch 607 is held is greater than or equal to a reference time. When the touch 607 on the internet application program 603 is held during the reference time, the virtual keypad controller 210 determines, as shown in FIG. 6B, whether a coordinate of the touch 607 is included in a reference region 613. When the coordinate of the touch 607 is included in the reference region 613, the virtual keypad controller 210 performs, as shown in FIG. 6C, a control operation to display a virtual keypad 623 on the display unit 160 through the display controller 220.

In addition, when a touch is sensed, the virtual keypad controller 210 determines whether a coordinate of the touch is fixed. If the coordinate of the touch is fixed, the virtual keypad controller 210 may determine whether the touch is held during a reference time.

In addition, the virtual keypad controller 210 may perform a control operation to change a shape of a virtual keypad in consideration of an application program which is being driven. For one example, as shown in FIG. 6D, when a video reproduction application program 641 is being driven, the virtual keypad controller 210 may perform a control operation to display a virtual control menu 643 which may control the video reproduction application program 641 through the display controller 220. For another example, as shown in FIG. 6E, when a memo application program 651 is being driven, the virtual keypad controller 210 may perform a control operation to display a virtual keypad 653 which may input memo contents to the memo application program 651 through the display controller 220.

In addition, when a plurality of touches are sensed, the virtual keypad controller 210 may perform a control operation to display a virtual keypad on at least one touch coordinate through the display controller 220 in consideration of a gradient of the electronic device 100.

In addition, after the virtual keypad is displayed, when input on the virtual keypad is not sensed during a reference time, the virtual keypad controller 210 may perform a control operation to release the display of the virtual keypad through the display controller 220.

In addition, after the virtual keypad is displayed, when drag on the virtual keypad is generated, the virtual keypad controller 210 may perform a control operation to change a position of the virtual keypad and display the virtual keypad in consideration of information about the drag through the display controller 220.

In addition, after the virtual keypad is displayed, when rotation of the electronic device 100 is sensed, the virtual keypad controller 210 may perform a control operation to change a position of the virtual keypad and display the virtual keypad in consideration of the rotation of the electronic device 100 through the display controller 220.

The display controller 220 executes the GUI program 113 stored in the program storing unit 111 and provides a UI as graphics on the display unit 160. For one example, the display controller 220 performs a control operation to display information of an application program driven by the application program driving unit 200 on the display unit 160. For another example, the display controller 220 may perform a control operation to display a virtual keypad on the display unit 160 by the virtual keypad controller 210.

In one embodiment of the present disclosure, the electronic device 100 performs a control operation to display the virtual keypad using the processor 122 including the virtual keypad controller 210.

In another embodiment of the present disclosure, the electronic device 100 may include a separate virtual keypad generation module for performing a control operation to display a virtual keypad.

Figure 3A:
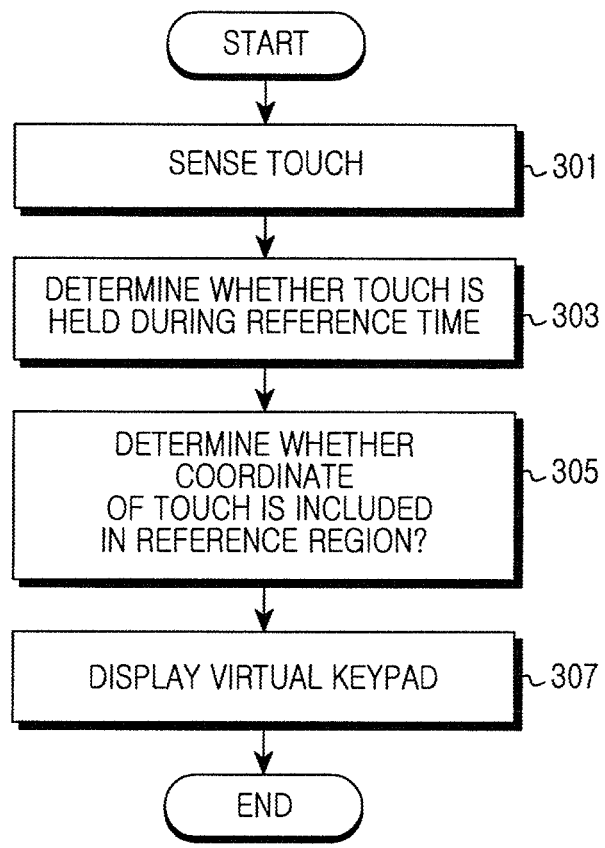
FIG. 3A illustrates a flowchart of a process of displaying a virtual keypad in consideration of touch information in an electronic device according to one embodiment of the present disclosure.

FIG. 3A illustrates a flowchart of a process of displaying a virtual keypad in consideration of touch information in an electronic device according to one embodiment of the present disclosure.

Referring to FIG. 3A, the electronic device senses a touch in step 301. For example, as shown in FIG. 6A, the electronic device determines whether a touch on an internet application program 603 displayed on a display unit 601 is sensed.

After the touch is sensed, the electronic device proceeds to step 303 and determines whether the touch is held during a reference time. For example, as shown in FIG. 6A, when the touch 607 on the internet application program 603 is sensed, the electronic device may verify whether a time when the touch 607 is held is greater than or equal to the reference time.

When the touch is held during the reference time, the electronic device proceeds to step 305 and determines whether a coordinate of the touch is included in a reference region. For example, as shown in FIG. 6A, when the touch 607 on the internet application program 603 is held during the reference time, the electronic device verifies, as shown in FIG. 6B, whether a coordinate of the touch 607 is included in a reference region 613.

When the coordinate of the touch 607 is included in the reference region, the electronic device proceeds to step 307 and displays a virtual keypad on the coordinate of the touch. For example, as shown in FIGS. 6A and 6B, when the coordinate of the touch 607 is included in the reference region 613, the electronic device displays, as shown in FIG. 6C, a virtual keypad 623 on an internet application program 621. Herein, the electronic device may include at least one of a move backward menu 625, a move forward menu 627, a window close menu 629, and a new window menu 631 which may control operations of the internet application program 621 in a control menu. Also, at least one key included in the virtual keypad 623 may be reconfigured by a user of the electronic device.

In addition, when a touch is sensed, the electronic device determines whether a coordinate of the touch is fixed. If the coordinate of the touch is fixed, the electronic device may determine whether the touch is held during a reference time.

In addition, the electronic device may change a shape of a virtual keypad and display the changed virtual keypad in consideration of an application program which is being driven. For one example, as shown in FIG. 6D, when a video reproduction application program 641 is being driven, the electronic device may display a virtual control menu 643 which may control the video reproduction application program 641. For another example, when a memo application program 651 is being driven, the electronic device may display, as shown in FIG. 6E, a virtual keypad 653 which may input memo contents to the memo application program 651.

In addition, when a plurality of touches are sensed, the electronic device may display a virtual keypad on at least one touch coordinate in consideration of the electronic device's gradient.

In addition, after the virtual keypad is displayed, when input on the virtual keypad is not sensed during a reference time, the electronic device may release the display of the virtual keypad.

In addition, after the virtual keypad is displayed, when drag on the virtual keypad is generated, the electronic device may change a position of the virtual keypad and display the virtual keypad in consideration of information about the drag.

In addition, after the virtual keypad is displayed, when rotation of the electronic device is sensed, the electronic device may change a position of the virtual keypad and display the virtual keypad in consideration of the electronic device's rotation.

Thereafter, the electronic device ends the algorithm of FIG. 3A.

Figure 3B:
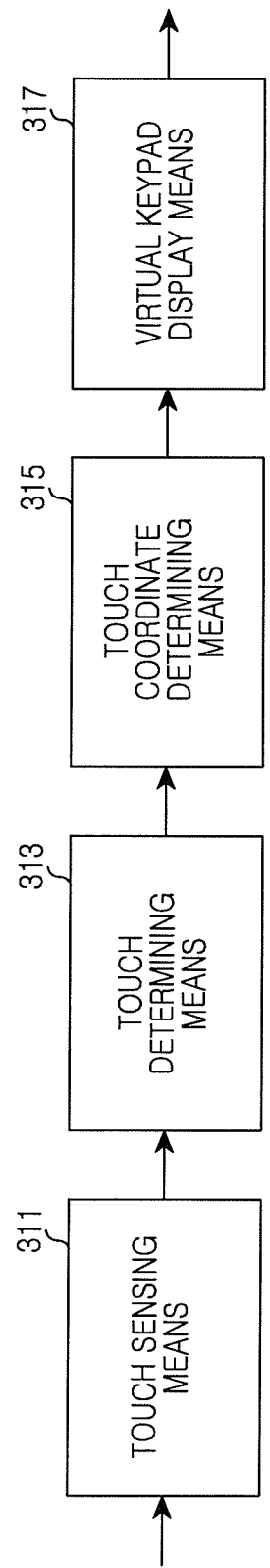
FIG. 3B illustrates a block diagram of configuration of an electronic device for displaying a virtual keypad in consideration of touch information according to one embodiment of the present disclosure.

As described above, the process of controlling the virtual keypad in consideration of the touch information in the electronic device may be configured, as shown in FIG. 3B, as an apparatus for controlling the virtual keypad in consideration of the touch information in the electronic device.

FIG. 3B illustrates a block diagram of configuration of an electronic device for displaying a virtual keypad in consideration of touch information according to one embodiment of the present disclosure.

Referring to FIG. 3B, the electronic device may include a touch sensing means, that is, a first means 311 for sensing a touch, a touch verifying means, that is, a second means 313 for determining and/or verifying whether the touch is held during a reference time, a touch coordinate verifying means, that is, a third means 315 for determining and/or verifying whether a coordinate of the touch is included in a reference region, and a virtual keypad display means, that is, a fourth means 317 for displaying a virtual keypad.

The first means 311 senses the touch. For example, as shown in FIG. 6A, the first means 311 determines and/or verifies whether a touch on an internet application program 603 displayed on a display unit 601 is sensed.

The second means 313 determines and/or verifies whether the touch is held during the reference time. For example, as shown in FIG. 6A, when a touch 607 on the internet application program 603 is sensed, the second means 313 determines and/or verifies whether a time when the touch 607 is held is greater than or equal to the reference time.

The third means 315 determines and/or verifies whether the coordinate of the touch is included in the reference region. For example, as shown in FIG. 6A, when the touch 607 on the internet application program 603 is held during the reference time, the third means 315 determines and/or verifies, as shown in FIG. 6B, whether a coordinate of the touch 607 is included in a reference region 613.

The fourth means 317 displays the virtual keypad. For example, as shown in FIGS. 6A and 6B, when the coordinate of the touch 607 is included in the reference region 613, the fourth means 317 displays, as shown in FIG. 6C, a virtual keypad 623 on an internet application program 621. Herein, the fourth means 317 may include at least one of a move backward menu 625, a move forward menu 627, a window close menu 629, and a new window menu 631 which may control operations of the internet application program 621 in a control menu. Also, at least one key included in the virtual keypad 623 may be reconfigured by a user of the electronic device.

In addition, when a touch is sensed, the electronic device determines and/or verifies whether a coordinate of the touch is fixed. If the coordinate of the touch is fixed, the electronic device may verify whether the touch is held during a reference time.

In addition, the electronic device may change a shape of a virtual keypad and display the changed virtual keypad in consideration of an application program which is being driven. For one example, as shown in FIG. 6D, when a video reproduction application program 641 is being driven, the electronic device may display a virtual control menu 643 which may control the video reproduction application program 641. For another example, when a memo application program 651 is being driven, the electronic device may display, as shown in FIG. 6E, a virtual keypad 653 which may input memo contents to the memo application program 651.

In addition, when a plurality of touches are sensed, the electronic device may display a virtual keypad on at least one touch coordinate in consideration of the electronic device's gradient.

In addition, after the virtual keypad is displayed, when input on the virtual keypad is not sensed during a reference time, the electronic device may release the display of the virtual keypad.

In addition, after the virtual keypad is displayed, when drag on the virtual keypad is generated, the electronic device may change a position of the virtual keypad and display the virtual keypad in consideration of information about the drag.

In addition, after the virtual keypad is displayed, when rotation of the electronic device is sensed, the electronic device may change a position of the virtual keypad and display the virtual keypad in consideration of the electronic device's rotation.

As described above, the electronic device may include a plurality of means for controlling a virtual keypad in consideration of touch information. Herein, the electronic device may include the plurality of means for controlling the virtual keypad in consideration of the touch information as one means.

Figure 4:
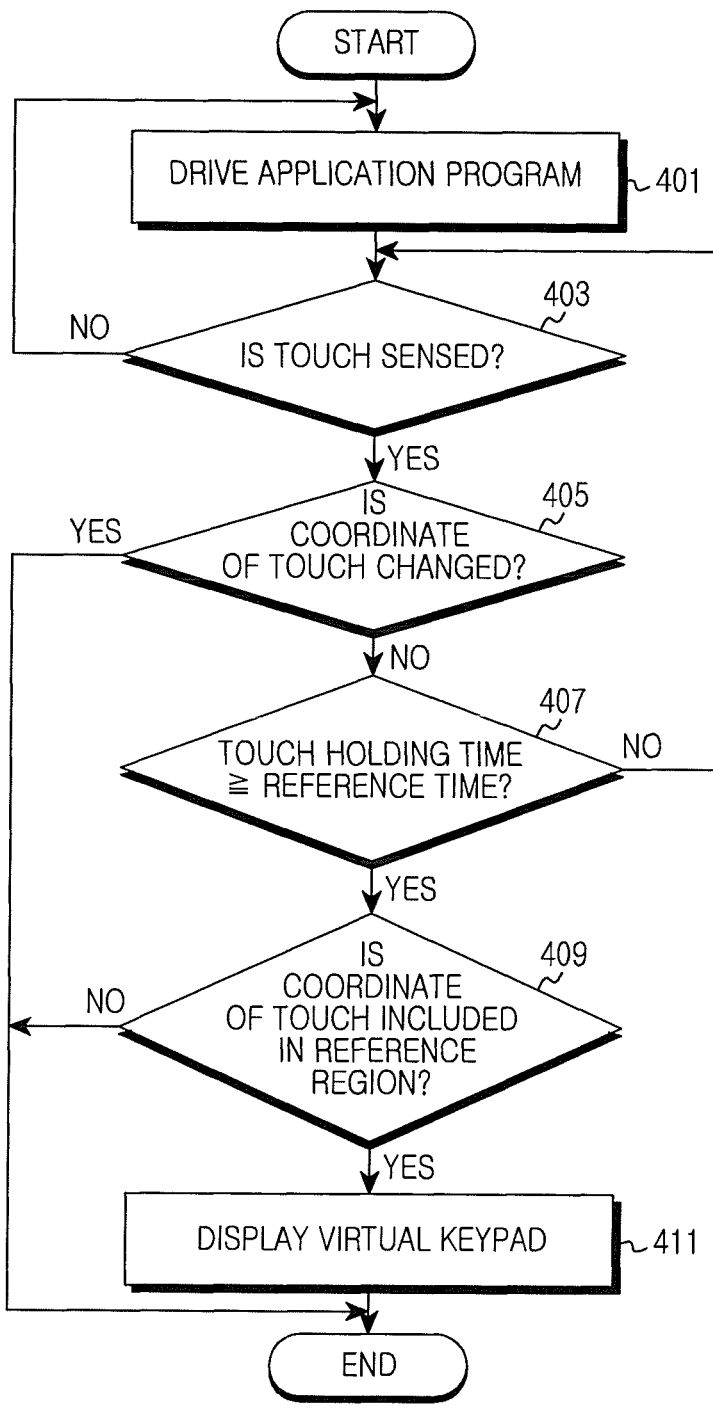
FIG. 4 illustrates a flowchart of a process of displaying a virtual keypad in consideration of touch information in an electronic device according to one embodiment of the present disclosure.

FIG. 4 illustrates a flowchart of a process of displaying a virtual keypad in consideration of touch information in an electronic device according to one embodiment of the present disclosure.

Referring to FIG. 4, the electronic device drives, launches, and/or executes program code of an application program in step 401. For example, as shown in FIG. 6A, the electronic device may display an internet application program 603 on a display unit 601.

The electronic device proceeds to step 403 and determines whether a touch is sensed in step 403. For example, as shown in FIG. 6A, the electronic device determines whether a touch 607 on the internet application program 603 displayed on the display unit 601 is sensed. If the touch 607 is not sensed, the electronic device proceeds to step 401 and holds display of the application program.

When the touch is sensed, the electronic device proceeds to step 405 and determines whether a coordinate of the touch sensed in step 403 is changed. For example, as shown in FIG. 6A, when the touch 607 on the internet application program 603 is sensed, the electronic device determines whether a change on the coordinate of the touch 607 is generated. Herein, the change on the coordinate of the touch may include at least one of drag and a touch release. If the coordinate of the touch is changed, the electronic device ends the algorithm of FIG. 4.

On the other hand, when the coordinate of the touch is not changed, the electronic device proceeds to step 407 and determines a touch holding time is greater than or equal to a reference time. For example, as shown in FIG. 6A, when the coordinate of the touch 607 is fixed without being changed, the electronic device verifies a time when the touch 607 is held. If the touch holding time is less than the reference time, the electronic device proceeds to step 403 and determines whether a touch is sensed.

On the other hand, when the touch holding time is greater than or equal to the reference time, the electronic device proceeds to step 409 and determines whether the coordinate of the touch is included in a reference region. For example, as shown in FIG. 6A, if the time when the touch 607 is held is greater than or equal to the reference time, the electronic device determines, as shown in FIG. 6B, whether the coordinate of the touch 607 is included in a reference region 613. If the coordinate of the touch is not included in the reference region, the electronic device ends the algorithm of FIG. 4.

On the other hand, when the coordinate of the touch is included in the reference region, the electronic device proceeds to step 411 and displays a virtual keypad on the coordinate of the touch. For example, as shown in FIGS. 6A and 6B, when the coordinate of the touch 607 is included in the reference region 613, the electronic device displays, as shown in FIG. 6C, a virtual keypad 623 on an internet application program 621. Herein, the electronic device may include at least one of a move backward menu 625, a move forward menu 627, a window close menu 629, and a new window menu 631 which may control operations of the internet application program 621 in a control menu. Also, at least one key included in the virtual keypad 623 may be reconfigured by a user of the electronic device.

In addition, the electronic device may change a shape of a virtual keypad and display the changed virtual keypad in consideration of an application program which is being driven. For one example, as shown in FIG. 6D, when a video reproduction application program 641 is being driven, the electronic device may display a virtual control menu 643 which may control the video reproduction application program 641. For another example, when a memo application program 651 is being driven, the electronic device may display, as shown in FIG. 6E, a virtual keypad 653 which may input memo contents to the memo application program 651.

In addition, after the virtual keypad is displayed, when input on the virtual keypad is not sensed during a reference time, the electronic device may release the display of the virtual keypad.

In addition, after the virtual keypad is displayed, when drag on the virtual keypad is generated, the electronic device may change a position of the virtual keypad and display the virtual keypad in consideration of information about the drag.

In addition, after the virtual keypad is displayed, when rotation of the electronic device is sensed, the electronic device may change a position of the virtual keypad and display the virtual keypad in consideration of the electronic device's rotation.

Thereafter, the electronic device ends the algorithm of FIG. 4.

Figure 5:
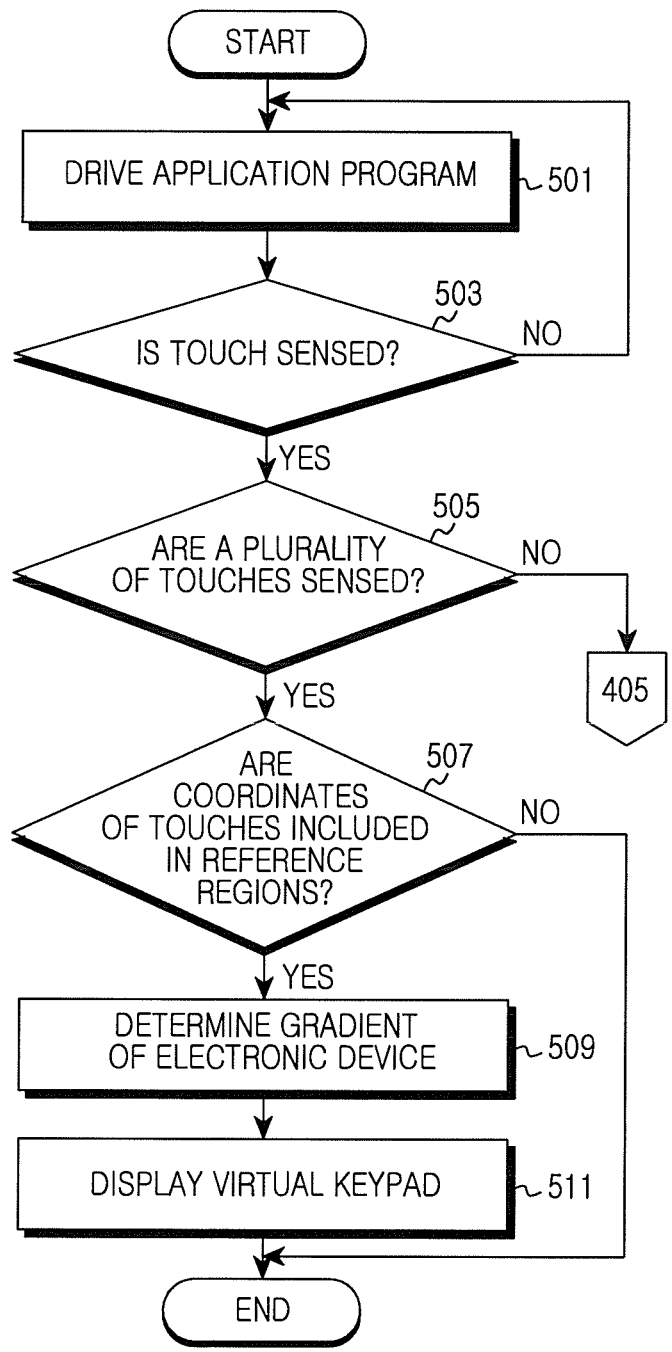
FIG. 5 illustrates a flowchart of a process of displaying a virtual keypad in consideration of touch information in an electronic device according to another embodiment of the present disclosure.

FIG. 5 illustrates a flowchart of a process of displaying a virtual keypad in consideration of touch information in an electronic device according to another embodiment of the present disclosure.

Referring to FIG. 5, the electronic device drives, launches, and/or executes program code for an application program in step 501. For example, as shown in FIG. 6A, the electronic device displays an internet application program 603 on a display unit 601.

The electronic device proceeds to step 503 and determines whether a touch is sensed. For example, as shown in FIG. 6A, the electronic device determines whether a touch on the internet application program 603 displayed on the display unit 601 is sensed. If the touch is not sensed, the electronic device proceeds to step 501 and holds display of the application program.

When the touch is sensed, the electronic device proceeds to step 505 and determines whether the touch sensed in step 503 is a plurality of touches. For example, as shown in FIG. 6A, the electronic device determines whether a plurality of touches on the internet application program 603 displayed on the display unit 601 are sensed. If the plurality of touches are not sensed, the electronic device proceeds to step 405 of FIG. 4 to display a control menu when one touch is sensed and determines whether a coordinate of the touch is changed.

On the other hand, when the plurality of touches are sensed, the electronic device proceeds to step 507 and determines whether coordinates of the plurality of touches are included in reference regions. For example, as shown in FIG. 6A, when a first touch 605 and a second touch 607 on the internet application program 603 are sensed, the electronic device verifies, as shown in FIG. 6B, coordinates of the first touch 605 and the second touch 607 are included in a first reference region 611 and a second reference region 613. If the coordinates of the plurality of touches are not included in the reference regions, the electronic device ends the algorithm of FIG. 5.

On the other hand, when the coordinates of the plurality of touches are included in the reference regions, the electronic device proceeds to step 509 and determines the electronic device's gradient. For example, as shown in FIG. 6B, the electronic device determines a region which is close to a ground surface between the first reference region 611 and the second reference region 613 using a tilt sensor (an acceleration sensor and a gyro sensor).

The electronic device proceeds to step 511 and displays a virtual keypad in consideration of the gradient. For example, as shown in FIGS. 6A and 6B, when the second reference region 613 including the coordinate of the second touch 607 is close to the ground surface, the electronic device displays, as shown in FIG. 6C, a virtual keypad 623 on the coordinate of the second touch 607 of an internet application program 621. Herein, the electronic device may include at least one of a move backward menu 625, a move forward menu 627, a window close menu 629, and a new window menu 631 which may control operations of the internet application program 621 in a control menu. Also, at least one key included in the virtual keypad 623 may be reconfigured by a user of the electronic device.

In addition, the electronic device may change a shape of a virtual keypad and display the changed virtual keypad in consideration of an application program which is being driven. For one example, as shown in FIG. 6D, when a video reproduction application program 641 is being driven, the electronic device may display a virtual control menu 643 which may control the video reproduction application program 641. For another example, when a memo application program 651 is being driven, the electronic device may display, as shown in FIG. 6E, a virtual keypad 653 which may input memo contents to the memo application program 651.

In addition, the electronic device may display a virtual keypad on at least one predetermined region among reference regions without the process of determining the electronic device's gradient in step 509.

In addition, after the virtual keypad is displayed, when input on the virtual keypad is not sensed during a reference time, the electronic device may release the display of the virtual keypad.

In addition, after the virtual keypad is displayed, when drag on the virtual keypad is generated, the electronic device may change a position of the virtual keypad and display the virtual keypad in consideration of information about the drag.

In addition, after the virtual keypad is displayed, when rotation of the electronic device is sensed, the electronic device may change a position of the virtual keypad and display the virtual keypad in consideration of the electronic device's rotation.

Thereafter, the electronic device ends the algorithm of FIG. 5.

It will be appreciated that embodiments of the present disclosure according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present disclosure. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. A method of operating an electronic device, the method comprising:

identifying at least one application program that is being displayed on a touch screen if touch is detected in a reference region on the touch screen and the detected touch is held greater than or equal to a reference time; and determining a configuration of a menu of a virtual keypad suitable for operating a function of the identified application program; and displaying the virtual keypad based on the determined configuration of the menu of the virtual keypad and a coordinate of the detected touch, wherein the reference region is a part of the touch screen.

2. The method of claim 1, wherein identifying the at least one application program comprises:

determining whether the coordinate of the detected touch is fixed in the reference region when the touch is detected; and determining whether the detected touch is held during the reference time if the coordinate of the touch is fixed.

3. The method of claim 1, wherein displaying the virtual keypad comprises:

identifying configuration information of the virtual keypad; and displaying the virtual keypad based on the configuration information of the virtual keypad, wherein the configuration information of the virtual keypad includes at least one of at least one control menu to be displayed on the virtual keypad, a position of the virtual keypad, a shape of the virtual keypad, a size of the virtual keypad, transparency of the virtual keypad, or a color degree of the virtual keypad.

4. The method of claim 1, wherein displaying the virtual keypad comprises displaying the virtual keypad based on at least one of a number of coordinates of a plurality of touches in response to the plurality of touches being detected.

5. The method of claim 4, wherein displaying the virtual keypad comprises:

determining a gradient of the electronic device; and displaying the virtual keypad based on at least one of the number of coordinates of the plurality of touches according to the gradient of the electronic device.

6. The method of claim 1, wherein displaying the virtual keypad comprises adjusting transparency of the virtual keypad and displaying the virtual keypad to be overlapped with at least one display information being displayed.

7. The method of claim 1, further comprising:

determining whether input on the virtual keypad is detected during a reference time; and releasing display of the virtual keypad in response to determining that the input on the virtual keypad is not detected during the reference time.

8. The method of claim 1, further comprising:

determining whether a drag on the virtual keypad is generated after the virtual keypad is displayed; and changing a position of the virtual keypad and displaying the virtual keypad in the changed position based on information of the drag in response to the drag on the virtual keypad being detected.

9. The method of claim 1, further comprising:

determining whether the electronic device is rotated after the virtual keypad is displayed; and changing a position of the virtual keypad and displaying the virtual keypad in the changed position based on a rotation of the electronic device in response to the electronic device being rotated.

10. An electronic device comprising:

at least one processor; and at least one memory configured to store at least one program, wherein the at least the one processor is configured to identify at least one application program that is being displayed on a touch screen if a touch is detected in a reference region on the touch screen and the detected touch is held greater than or equal to a reference time, determine a configuration of a menu of a virtual keypad suitable for operating a function of the identified application program, and display the virtual keypad based on the determined configuration of the menu of the virtual keypad and a coordinate of the detected touch, wherein the reference region is a part of the touch screen.

11. The electronic device of claim 10, wherein the at least the one processor is configured to determine whether the coordinate of the detected touch is fixed in the reference region if the touch is detected and determine whether the detected touch is held during the reference time if the coordinate of the touch is fixed.

12. The electronic device of claim 10, wherein the at least the one processor is configured to identify configuration information of the virtual keypad and control the display to display the virtual keypad based on the configuration information of the virtual keypad, and wherein the configuration information of the virtual keypad includes at least one of at least one control menu to be displayed on the virtual keypad, a position of the virtual keypad, a shape of the virtual keypad, a size of the virtual keypad, transparency of the virtual keypad, or a color degree of the virtual keypad.

13. The electronic device of claim 10, wherein the at least the one processor is configured to control the display to display the virtual keypad based on at least one of a number of coordinates of a plurality of touches in response to the plurality of touches being detected.

14. The electronic device of claim 13, wherein at least the one processor is configured to determine a gradient of the electronic device and control the display to display the virtual keypad based on at least one of the number of coordinates of the plurality of touches according to the gradient of the electronic device.

15. The electronic device of claim 10, wherein the at least the one processor is configured to control the display to adjust transparency of the virtual keypad and display the virtual keypad to be overlapped with at least one display information being displayed.

16. The electronic device of claim 10, wherein the at least the one processor is configured to determine whether input on the virtual keypad is detected during a reference time and control the display to release display of the virtual keypad in response to determining that the input on the virtual keypad is not detected during the reference time.

17. The electronic device of claim 10, wherein the at least the one processor is configured to determine whether a drag on the virtual keypad is generated after the virtual keypad is displayed, and control the display to change a position of the virtual keypad and display the virtual keypad in the changed position based on information of the drag in response to the drag on the virtual keypad being detected.

18. The electronic device of claim 10, wherein the at least the one processor is configured to determine whether the electronic device is rotated after the virtual keypad is displayed, and changes a position of the virtual keypad and displays the virtual keypad in the changed position based on a rotation of the electronic device in response to the electronic device being rotated.

* * * * *